United States Patent
Wilson et al.

(10) Patent No.: US 8,134,248 B2
(45) Date of Patent: Mar. 13, 2012

(54) AEROGENERATOR HAVING ROTATION SUPPORT UNIT FOR FACILITATING ROTATION OF ROTATIONAL BODY

(75) Inventors: Chris Wilson, Portland, OR (US); John Nelson, Portland, OR (US); Michael Baker, Gig Harbor, WA (US)

(73) Assignee: Dominic Investment, Inc., Lake Oswego, OR (US)

( * ) Notice: Subject to any disclaimer, the term of this patent is extended or adjusted under 35 U.S.C. 154(b) by 652 days.

(21) Appl. No.: 12/274,985

(22) Filed: Nov. 20, 2008

(65) Prior Publication Data

US 2010/0109335 A1    May 6, 2010

(30) Foreign Application Priority Data

Nov. 5, 2008  (KR) .................. 10-2008-0109355

(51) Int. Cl.
- *F03D 9/00* (2006.01)
- *F03B 15/06* (2006.01)
- *B63H 7/00* (2006.01)

(52) U.S. Cl. .......... 290/55; 415/4.3; 415/4.5; 416/146 R

(58) Field of Classification Search ............ 290/55, 290/44, 54; 415/4.2, 4.3, 4.4, 4.5; 416/119, 416/17, 146 R, 85

See application file for complete search history.

(56) References Cited

U.S. PATENT DOCUMENTS

| | | | |
|---|---|---|---|
| 5,302,084 A * | 4/1994 | Nelson | 416/17 |
| 6,158,953 A * | 12/2000 | Lamont | 415/4.4 |
| 7,056,082 B1 * | 6/2006 | Taylor | 415/4.2 |
| 7,744,345 B1 * | 6/2010 | Pohribnak | 416/9 |

* cited by examiner

*Primary Examiner* — Thomas L Dickey
*Assistant Examiner* — Nikolay Yushin
(74) *Attorney, Agent, or Firm* — Sherr & Vaughn, PLLC

(57) ABSTRACT

Disclosed herein is an aerogenerator having a rotation support unit for facilitating rotation of a rotational body. The aerogenerator includes a support pillar, a rotational body, vanes, a rotating force transmission unit, a generating unit and a rotation support unit. The support pillar has a hollow space therein and has a support extension on the upper end thereof. The rotational body is provided on the upper end of the support pillar so as to be rotatable using the rotation support unit. The vanes are provided on opposite ends of the rotational body. The rotating force transmission unit transmits rotating force of the vanes to the generating unit. In the present invention, the rotation support unit comprises a rotating plate which is provided between the rotational body and the support pillar, and first rollers which are provided in the rotating plate and are in contact with the rotational body and the support extension. The rotation support unit further comprises second rollers which are provided under the rotating plate and are in contact with the inner surface of the hollow space of the support pillar. Therefore, the rotational body can easily rotate on the upper end of the support pillar by the first rollers, and the rotating plate can be prevented from being separated from the upper end of the support pillar by the second rollers.

3 Claims, 5 Drawing Sheets

AEROGENERATOR HAVING ROTATION SUPPORT UNIT FOR FACILITATING ROTATION OF ROTATIONAL BODY

The present application claims priority to Korean Patent Application No. 10-2008-0109355 (filed on Nov. 5, 2008) which is hereby incorporated by reference in its entirety.

BACKGROUND OF THE INVENTION

1. Field of the Invention

The present invention relates generally to aerogenerators and, more particularly, to an aerogenerator in which a rotation support unit for enabling a rotational body to rotate on an upper end of a support pillar reduces a contact area between the rotational body and the support pillar, thus making it possible to more smoothly rotate the rotational body in the direction in which the wind is blowing.

2. Description of the Related Art

As well known to those skilled in the art, aerogenerators are one kind of generators which obtain rotating force in such a way as to rotate vanes using naturally-occurring wind, convert the rotating force into electric energy, and supply the produced electricity to areas where it is needed.

Such an aerogenerator includes a support pillar, rotational bodies and vanes. The support pillar is placed upright on the ground.

The rotational body is rotatably provided on the upper end of the support pillar, and the vanes are supported by the rotational body and provided on respective opposite ends of the upper end of the support pillar. The vanes generate rotating force using the wind.

In the aerogenerator having the above-mentioned construction, the rotational body is rotated depending on the direction of the wind such that the vanes are easily oriented facing in and away from the direction in which the wind is blowing, so that the vanes can be more effectively rotated by the wind.

Recently, aerogenerators have been used which include a pair of vanes and which are constructed such that a rotational body is rapidly rotated in the direction in which the wind is blowing so as to increase rotating force of the vanes.

FIG. 1 is a view illustrating a conventional aerogenerator.

As shown in the drawing, the conventional aerogenerator 1 includes a support pillar 10 which is placed upright on the ground, a rotational body 20 which is rotatably provided on the upper end of the support pillar 10, and two vanes 30 which are rotatably provided on the respective opposite ends of the rotational body 20.

Furthermore, a generating unit 40 is provided in the support pillar 10 or on the ground. A rotating force transmission unit 50 which increases the rotating force of the vanes 30 and transmits it to the generating unit 40 is provided in the rotational body 20.

The transmission unit 50 is disposed at an upper position in the central portion of the rotational body 20 and connects rotating shafts 32 of the vanes 30 to a rotating shaft 42 connected to the generating unit 40. The transmission unit 50 is protected by a cover 22.

Furthermore, a rotation support unit 60 is provided between the rotational body 20 and the support pillar 10. The rotation support unit 60 includes a rotating plate 62 and a plurality of rollers 64 which are provided on the rotating plate 62 and arranged in a circumferential direction. Thus, the rotational body 20 is supported on the upper end of the support pillar 10 so as to be rotatable using the rotation support unit 60.

Due to the above-mentioned construction, the rotational body 20 having the vanes 30 is easily rotated in the direction in which the wind blows, so that the rotating force of the vanes 30 can be increased, thus enhancing the amount of produced electric energy.

However, in the conventional aerogenerator 1, each of the rollers 64, which rotate in the circumferential direction around the center of the rotating plate 62, has a frusto-conical shape. Thus, the contact area of the rollers 64 with the rotational body 20 and the support pillar 10 is relatively large, with the result that the friction therebetween is increased.

Due to relatively high friction, not only the circumferential outer surface of the rollers 64 but also the surfaces of the rotational body 20 and the support pillar 10 get worn with the passage of time. As a result, the rotational body 20 cannot smoothly rotate on the support pillar 10. Thereby, the rotational body 20 cannot rapidly rotate in the direction in which the wind is blowing, thus reducing the efficiency of producing electric energy.

SUMMARY OF THE INVENTION

Accordingly, the present invention has been made keeping in mind the above problems occurring in the related art, and an object of the present invention is to provide an aerogenerator having a rotation support unit which includes first rollers provided between a rotational body and a support pillar so as to be rotatable in the circumferential direction, the first rollers having a reduced contact area with rotational body and the support pillar, thus reducing the friction therebetween, thereby making it possible to more smoothly rotate the rotational body with respect to the support pillar.

Another object of the present invention is to provide an aerogenerator having the rotation support unit which includes second rollers provided under a rotating plate so as to be rotatable along an inner surface of a hollow space of the support pillar, thus preventing the rotating plate from undesirably separating from the upper end of the support pillar.

A further object of the present invention is to provide an aerogenerator having the rotation support unit in which roller guide grooves are formed in the surfaces of the rotational body and the support pillar which are in contact with the first and second rollers, so that the rotation of the first and second rollers can be reliably guided by the roller guide grooves, thus preventing the first and second rollers from being undesirably displaced from the normal rotating orbits thereof.

In order to accomplish the above object, the present invention provides an aerogenerator, including: a support pillar placed upright on a ground, the support pillar having a hollow space therein, with a support extension extending a predetermined distance from an upper end of the support pillar inwards such that the hollow space is open on the upper end of the support pillar through a center of the support extension; a rotational body provided on the upper end of the support pillar so as to be rotatable using a rotation support unit having rollers, with vanes provided on respective opposite ends of the rotational body, the vanes being rotated by wind; and a rotating force transmission unit to transmit a rotating force of the vanes to a generating unit, the rotation support unit comprising: a rotating plate provided between the rotational body and the support pillar; first rollers provided in a perimeter of the rotating plate at positions spaced apart from each other at regular intervals in a circumferential direction of the rotating plate, the first rollers in contact with a lower surface of the rotational body and an upper surface of the support extension of the support pillar; and second rollers provided under a perimeter of a lower surface of the rotating plate at positions spaced apart from each other at regular intervals in the circumferential direction of the rotating plate, the second rollers in contact with an inner surface of the hollow space of the support pillar, whereby the rotational body easily rotates on the upper surface of the support extension of the support pillar because of the first rollers, and the rotational plate is prevented from being separated from the upper end of the support pillar by the second rollers.

Preferably, a first roller guide groove may be formed in each of the upper surface of the support extension of the support pillar and the lower surface of the rotational body that are in contact with the first rollers, so that the first rollers are guided by the first roller guide groove.

Furthermore, a second roller guide groove may be formed in the inner surface of the hollow space of the support pillar which is in contact with the second rollers, so that the second rollers are guided by the second roller guide groove.

In addition, roller support shafts may be fastened to the lower surface of the rotating plate and bent towards the inner surface of the support pillar, and the second rollers may be rotatably provided on ends of the respective roller support shafts and be in contact with the inner surface of the support pillar.

As well, a guide protrusion may be provided under a lower surface of the support extension of the support pillar and extend in a circumferential direction of the support extension, wherein the second rollers are in contact with one surface of the guide protrusion and move along the guide protrusion.

Moreover, a second roller guide groove may be formed on the surface of the guide protrusion which is in contact with the second rollers, so that the second rollers are guided by the second roller guide groove.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

The preferred embodiments of the present invention do not limit the bounds of the present invention but are presented only for illustrative purposes, and various modifications, additions and substitutions are possible, without departing from the scope and spirit of the invention.

Figure 1:
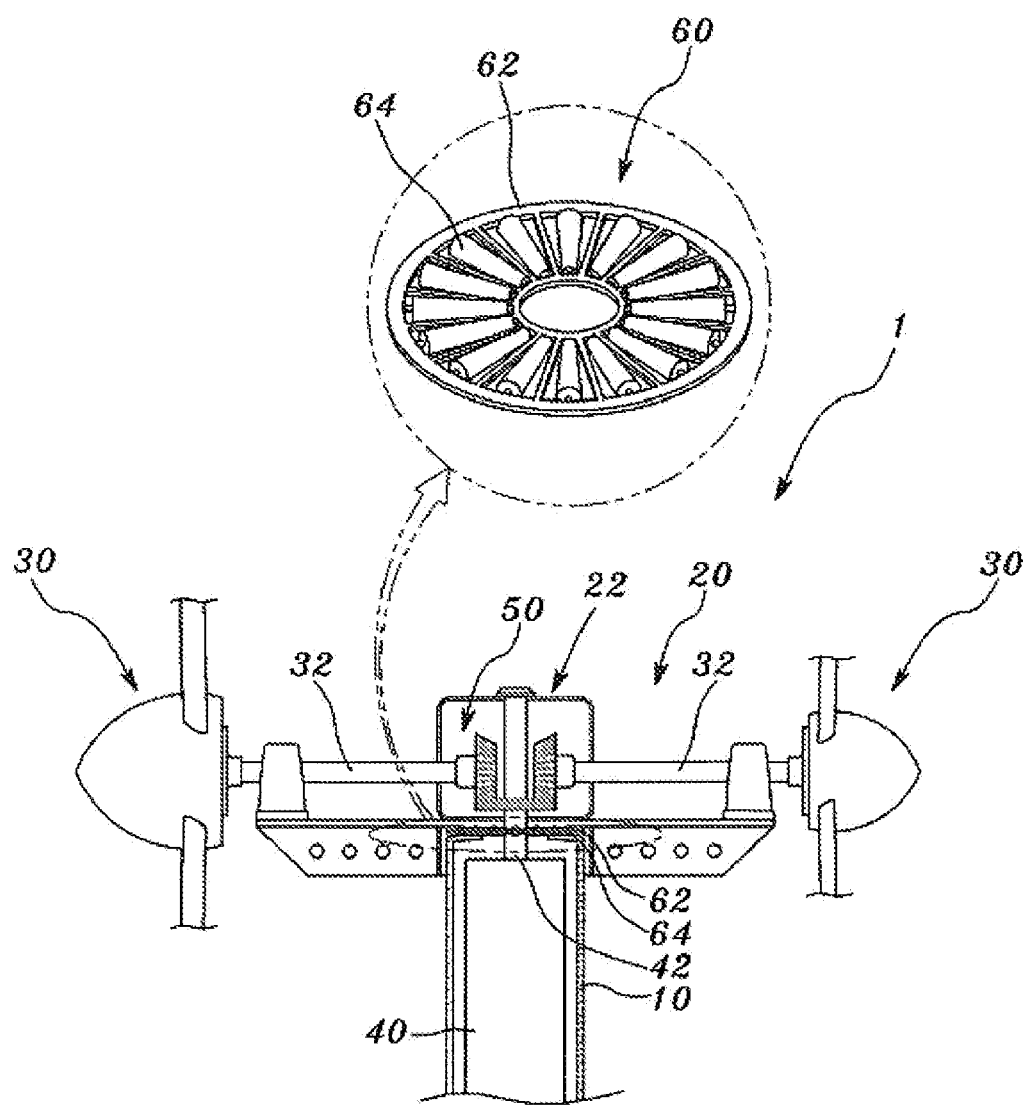
FIG. 1 is a view illustrating a conventional aerogenerator.
Figure 2:
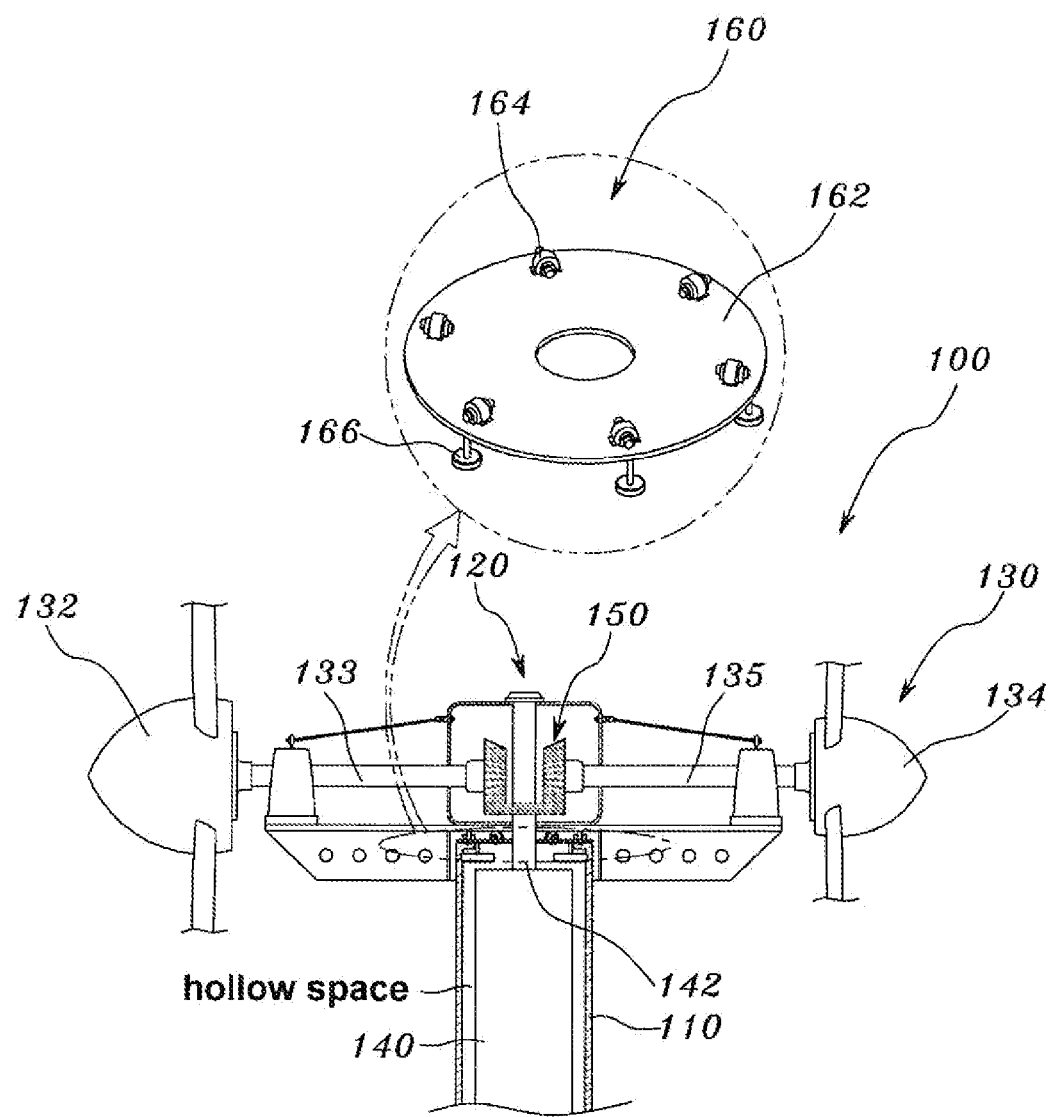
FIG. 2 is a sectional view of an aerogenerator having a rotation support unit for facilitating rotation of a rotational body, according to the present invention.
Figure 3:
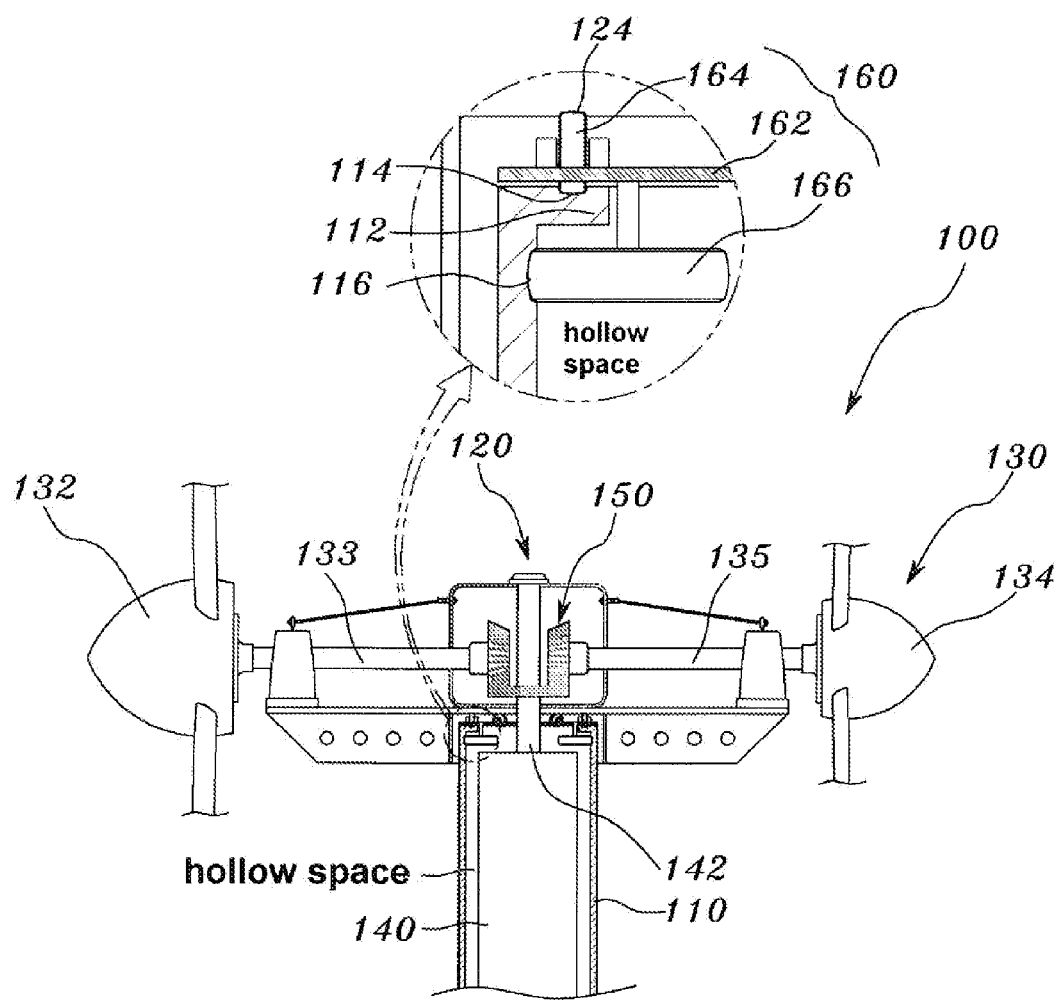
FIG. 3 is a view illustrating an embodiment of the rotation support unit of the aerogenerator according to the present invention.
Figure 4:
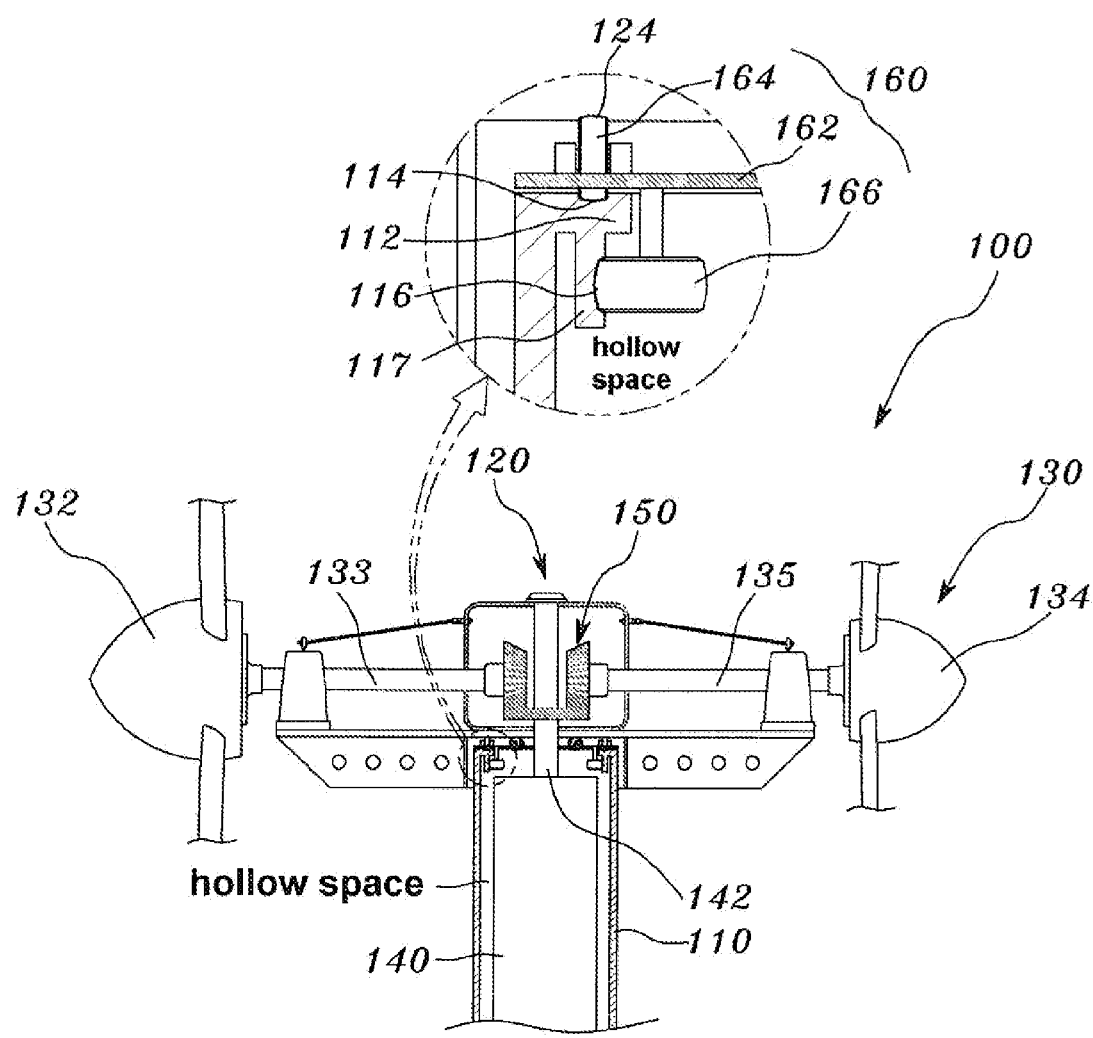
FIG. 4 is a view illustrating another embodiment of the rotation support unit of the aerogenerator according to the present invention.
Figure 5:
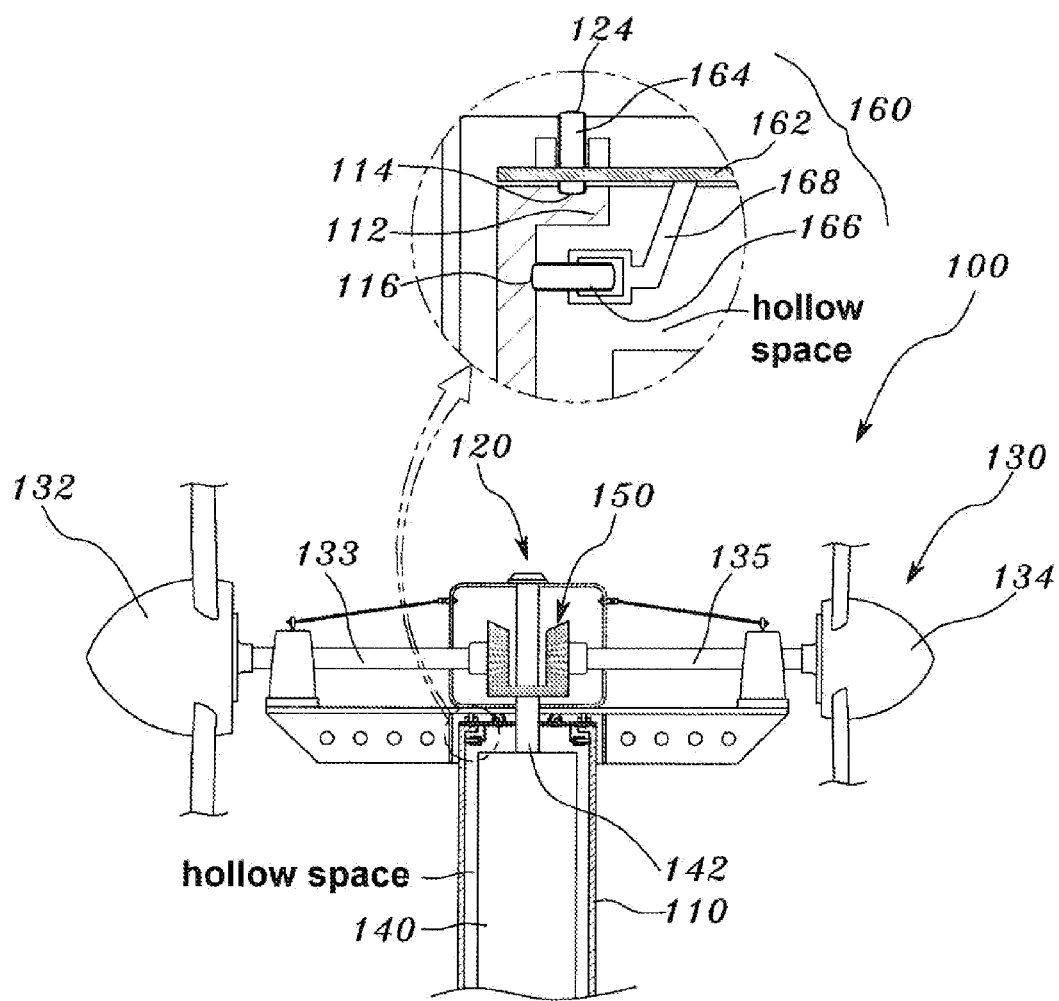
FIG. 5 is a view illustrating a further embodiment of the rotation support unit of the aerogenerator according to the present invention.

FIG. 2 is a sectional view illustrating an aerogenerator 100 having a rotation support unit 160 for facilitating rotation of a rotational body, according to the present invention. FIG. 3 is a view illustrating an embodiment of the rotation support unit 160 of the aerogenerator 100 according to the present invention. FIG. 4 is a view illustrating another embodiment of the rotation support unit 160 of the aerogenerator 100 according to the present invention. FIG. 5 is a view illustrating a further embodiment of the rotation support unit 160 of the aerogenerator 100 according to the present invention.

As shown in the drawings, the aerogenerator 100 according to the present invention includes a support pillar 110, a rotational body 120, vanes 130, a generating unit 140, a rotating force transmission unit 150 and the rotation support unit 160.

The support pillar 110 is placed upright on the ground. The support pillar 110 has therein a hollow space which is open on the upper end thereof. A support extension 112 extends from the upper end of the support pillar 110 towards the central axis thereof. The rotational body 120 is rotatable on the upper surface of the support extension 112 around the central axis of the support pillar 110.

The rotational body 120 supports the vanes 130 on respective opposite ends thereof. The rotating force transmission unit 150 is provided in the rotational body 120 to transmit rotating force of the vanes 130 to the generating unit 140.

The rotation support unit 160 is provided between the support pillar 110 and the rotational body 120 to allow the rotational body 120 to rotate easily depending on the direction of the wind.

That is, the rotation support unit 160 rapidly rotates the rotational body 120 such that the vanes 130 orient themselves in the direction in which the wind is blowing, thus increasing the rotating force of the vanes 130.

Here, the vanes 130 include a main vane 132 and a subsidiary vane 134. The main vane 132 is larger than the subsidiary vane 134.

The generating unit 140 is installed in the support pillar 110 or provided on the ground to convert a rotating force transmitted from the vanes 130 into electrical energy. The rotating force transmission unit 150 functions to transmit rotating force of the vanes 130 to the generating unit 140.

The rotating force transmission unit 150 is provided in the rotational body 120 and connects rotating shafts 133 and 135 of the main and subsidiary vanes 132 and 134 to a rotating shaft 142 of the generating unit 140 such that the rotating force of the vanes 130 is perpendicularly transmitted to the generating unit 140.

As shown in FIG. 2, the rotation support unit 160 includes a rotating plate 162, first rollers 164 and second rollers 166. The rotating plate 162 is provided between the rotational body 120 and the support pillar 110.

The first rollers 164 are provided in the perimeter of the rotating plate 162 at positions spaced apart from each other at regular intervals in the circumferential direction of the rotating plate 162. The first rollers 164 are in contact with the lower surface of the rotational body 120 and the upper surface of the support extension 112 of the support pillar 110.

Thanks to the first rollers 164, the rotational body 120 can easily rotate on the upper surface of the support extension 112 of the support pillar 110. Compared to the conventional rollers having frusto-conical shapes, here the contact area is greatly reduced, so that the rotational body 120 can more smoothly rotate because of the reduction in friction.

Furthermore, the second rollers 166 are provided under the perimeter of the lower surface of the rotating plate 162 at positions spaced apart from each other at regular intervals in the circumferential direction of the rotating plate 162. The second rollers 166 are in contact with the inner surface of the hollow space of the support pillar 110. Thus, the rotating plate 162 can be prevented from being undesirably removed from the upper end of the support pillar 110.

Here, first roller guide grooves 114 and 124 are respectively formed in the upper surface of the support extension 112 of the support pillar 110 and the lower surface of the rotational body 120, that is, in the contact surfaces of the support extension 112 of the support pillar 110 and the rotational body 120 which are in contact with the first rollers 164. The first roller guide grooves 114 and 124 guide the rotation of the first rollers 164, so that the rotational body 120 can more smoothly rotate and the first rollers 164 can be prevented from being displaced from their normal rotating orbit.

In addition, a second roller guide groove 116 which guides the rotation of the second rollers 166 is formed in the inner surface of the hollow space of the support pillar 110 which is in contact with the second rollers 116.

The second roller guide groove 116 has the same role as that of the first roller guide grooves 114 and 124, that is, it functions to prevent the second rollers 166 from being displaced from the normal rotating orbit. As well, the second roller guide groove 116 also functions to prevent the rotating plate 162 from being undesirably separated from the upper end of the support pillar 110.

Meanwhile, as shown in FIG. 4, a guide protrusion 117 may be further provided under the lower surface of the support extension 112 of the support pillar 110 and extend in the circumferential direction of the support extension 112. In this case, second rollers 116 are in contact with the surface of the guide protrusion 117 and move along the guide protrusion 117.

Due to the guide protrusion 117, the diameter of the second roller 166 is prevented from being excessively larger than that of the first roller 164, so that a load applied to the rotating plate 162 by the second rollers 166 can be reduced and, thus, the rotating plate 162 can more effectively rotate.

Here, a first roller guide groove 114 is formed in the upper surface of the support extension 112 which is in contact with the first rollers 164. A second roller guide groove 116 is formed in a portion of the guide protrusion 117 which is in contact with the second rollers 166, so that the rotation of the second rollers 166 is guided by the second roller guide groove 116.

Meanwhile, as shown in FIG. 5, the rotation support unit 160 may be constructed such that roller support shafts 168 are fastened to the lower surface of the rotating plate 162 and bent towards the inner surface of the support pillar 110 and second rollers 166 are rotatably provided on the ends of the respective roller support shafts 168 and are in contact with the inner surface of the support pillar 110. In this case, the diameter of the second roller 166 can also be prevented from being excessively larger than that of the first roller 164.

Here, preferably, each roller support shaft 168 is bent at an obtuse angle to prevent the roller support shaft 168 from being damaged by the centrifugal force generated when the rotational body 120 rotates.

As described above, in an aerogenerator having a rotation support unit for facilitating rotation of a rotational body according to the present invention, a contact area between the rotation support unit and the rotational body or a support pillar is reduced, thus reducing friction therebetween. Thereby, the rotation of the rotational body on the upper end of the support pillar can become smoother, so that the rotational body can rapidly rotate such that the vanes are oriented in the direction in which the wind is blowing. As a result, the rotating force of the vanes is increased and, thus, more electric energy is produced.

What is claimed is:

1. An aerogenerator, comprising:
a support pillar placed upright on ground, the support pillar having a hollow space therein, with a support extension extending a predetermined distance from an upper end of the support pillar inwards such that the hollow space is open on the upper end of the support pillar through a center of the support extension;
a rotational body, provided on the upper end of the support pillar, which is rotatable on a rotation support unit having rollers, the rotational body including vanes provided on opposite ends of the rotational body, the vanes being rotatable by wind; and
a rotating force transmission unit to transmit a rotating force of the vanes to a generating unit,
wherein the rotation support unit includes:
a rotating plate provided between the rotational body and the support pillar;
first rollers provided at a perimeter of the rotating plate at positions spaced apart from each other at regular intervals around the circumference of the rotating plate, the first rollers in contact with a lower surface of the rotational body and an upper surface of the support extension of the support pillar; and
second rollers provided under a perimeter of a lower surface of the rotating plate at positions spaced apart from each other at regular intervals around the circumference of the rotating plate, the second rollers in contact with an inner surface of the hollow space of the support pillar,
whereby the rotational body easily rotates on the upper surface of the support extension of the support pillar because of the first rollers, and the rotational plate is prevented from being separated from the upper end of the support pillar by the second rollers,
wherein roller support shafts are fastened to the lower surface of the rotating plate and bent towards the inner surface of the support pillar, and the second rollers are rotatably mounted on ends of the respective roller support shafts and are in contact with the inner surface of the support pillar.

2. An aerogenerator, comprising:
a support pillar placed upright on ground, the support pillar having a hollow space therein, with a support extension extending a predetermined distance from an upper end of the support pillar inwards such that the hollow space is open on the upper end of the support pillar through a center of the support extension;
a rotational body, provided on the upper end of the support pillar, which is rotatable on a rotation support unit having rollers, the rotational body including vanes provided on opposite ends of the rotational body, the vanes being rotatable by wind; and
a rotating force transmission unit to transmit a rotating force of the vanes to a generating unit,
wherein the rotation support unit includes:
a rotating plate provided between the rotational body and the support pillar;
first rollers provided at a perimeter of the rotating plate at positions spaced apart from each other at regular intervals around the circumference of the rotating plate, the first rollers in contact with a lower surface of the rotational body and an upper surface of the support extension of the support pillar; and
second rollers provided under a perimeter of a lower surface of the rotating plate at positions spaced apart from each other at regular intervals around the circumference of the rotating plate, the second rollers in contact with an inner surface of the hollow space of the support pillar, whereby the rotational body easily rotates on the upper surface of the support extension of the support pillar because of the first rollers, and the rotational plate is prevented from being separated from the upper end of the support pillar by the second rollers, wherein a guide protrusion is provided under a lower surface of the support extension of the support pillar and extends around the circumference of the support extension, wherein the second rollers are in contact with one surface of the guide protrusion and move along the guide protrusion.

3. The aerogenerator as set forth in claim 2, wherein a second roller guide groove is formed on the surface of the guide protrusion which is in contact with the second rollers, so that the second rollers are guided by the second roller guide groove.

* * * * *